May 2, 1950          J. F. FAULKNER          2,505,759
HELICOPTER CONTROL SYSTEM
Filed June 24, 1946          3 Sheets-Sheet 1
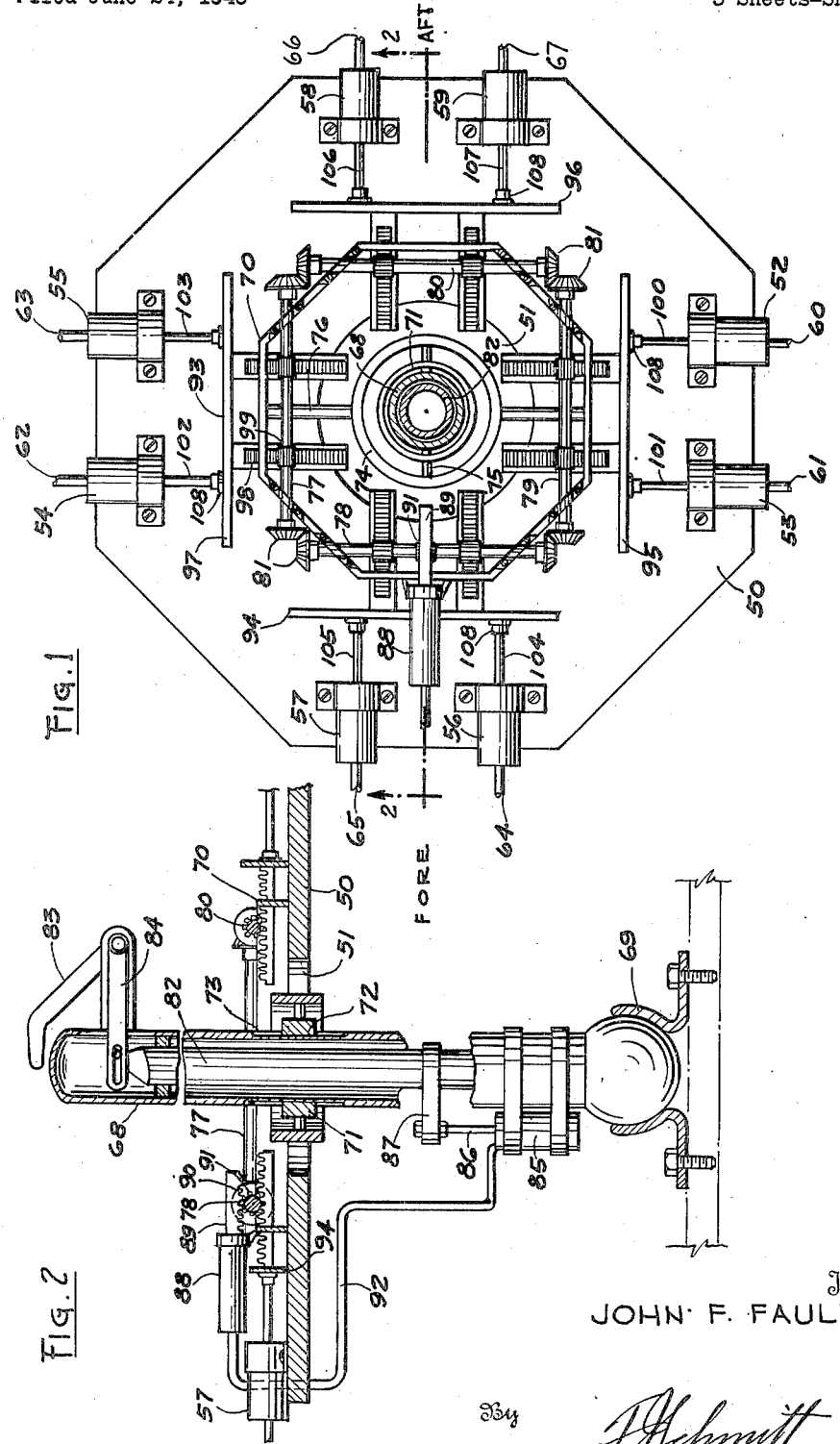
Inventor
JOHN F. FAULKNER
By P. J. Schmitt
Attorney

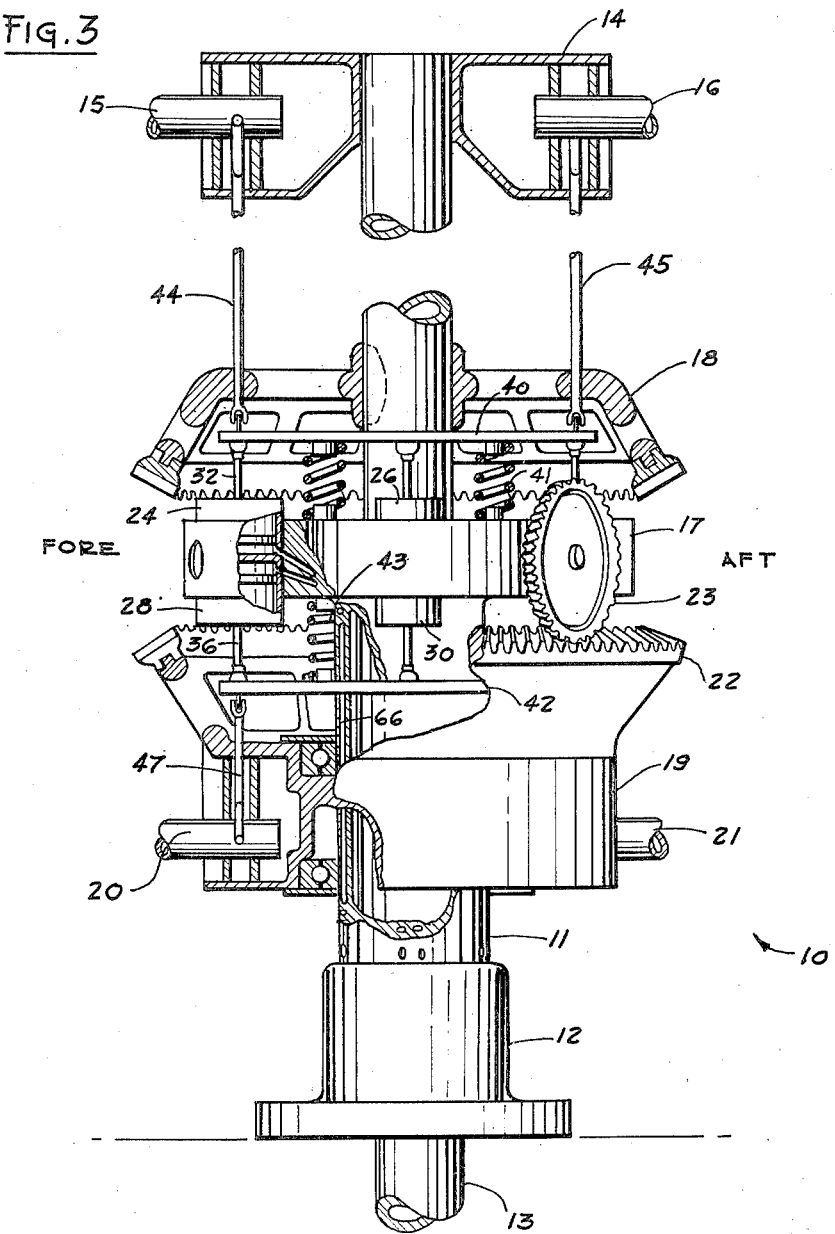

Patented May 2, 1950

2,505,759

UNITED STATES PATENT OFFICE 2,505,759

HELICOPTER CONTROL SYSTEM

John F. Faulkner, United States Navy

Application June 24, 1946, Serial No. 678,761

10 Claims. (Cl. 170—135.24)

(Granted under the act of March 3, 1883, as amended April 30, 1928; 370 O. G. 757)

This invention relates to aircraft controls and more particularly to controls for helicopters or aircraft of the rotary wing type.

Objects of the invention are to provide improved controls for helicopters in which all manual controlling operations are governed by a single control post; to provide improved controls which enable operators to maneuver helicopters as desired by corresponding or similar movement of the control post; and to provide improved controls of the character described that are hydraulically actuated.

Further objects of the invention are to provide improved controls for helicopters of the type having pairs of counter rotatable wings of variable pitch and cooperable cam rings for regulating the pitch in which control is effected by both adjusting the cant of the cam rings by hydraulic means and also adjusting the position of the rings independently of the cant by the same hydraulic means; and to provide improved controls for canting the cam rings by universal or pivotal movement of the control stick and for adjusting the position of the cam rings independently of the cant thereof by axial movement of means supported on the control stick.

It is a further object of the invention to provide for carrying out the foregoing objects in a facile, economical and efficient manner.

In accomplishing these and other objects of the present invention, I have provided improved details of structure, a preferred form of which is shown in the accompanying drawings, wherein:

Fig. 1 is a top plan view of the portion of a control mechanism situated within the body of a helicopter and embodying the features of the present invention;

Fig. 2 is a vertical sectional view taken substantially on the line 2—2 of Fig. 1;

Fig. 3 is a side elevational view, partly in section, of the counter-rotational wing mounting showing the hydraulic mechanism for adjusting the cam rings.

Figure 4:
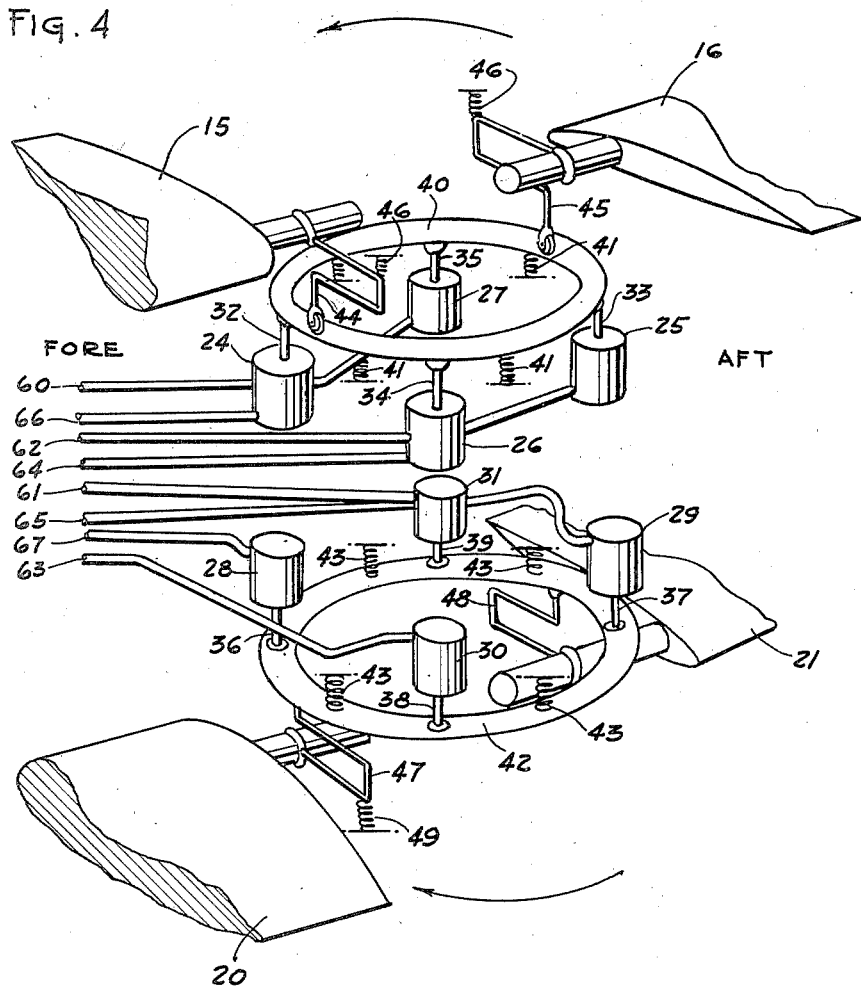
Fig. 4 is a view similar to Fig. 3, but illustrating the mechanism schematically.

Referring more in detail to the drawings:

In Fig. 3 there is shown at 10 a mounting for helicopter wings of the counter-rotational type. The mounting includes an external sleeve 11 adapted to be fixed to the exterior of the top of a helicopter as by a collar 12. The sleeve functions as a bearing for a drive shaft 13 connected to a source of power, not shown, within the body of the helicopter.

An upper wing mounting disc 14 is fixed to the drive shaft to rotate therewith and carries wings 15 and 16 of variable pitch in diametrically opposed relation. An intermediate support or stator 17 is fixed to the sleeve 11. An upper bevel gear 18 is fixed to the shaft 13 to rotate therewith. An annular lower wing mounting disc is rotatably mounted externally of the sleeve 11 on suitable bearing assemblies and carries wings 20 and 21 similar to the wings 15 and 16. A lower bevel gear 22 is fixed to said lower disc. The stator 17 carries one or more planetary gears 23 that mesh with the bevel gears 18 and 22.

By means of the construction thus far described, rotation of the drive shaft 13 rotates the upper wings 15 and 16 by direct drive of the mounting disc 14, and rotates the lower wings 20 and 21 in the opposite direction through the bevel gears 18 and 22 and the planetary gears 23.

The stator 17 carries eight hydraulic cylinders, which as best shown in Fig. 4, are arranged as follows: upper fore and aft cylinders 24 and 25 respectively, upper athwartships cylinders 26 and 27, lower fore and aft cylinders 28 and 29 respectively, and lower athwartships cylinders 30 and 31. Preferably upper and lower cylinders in each position are formed integrally and the bores thereof divided by partitions, as best illustrated in the case of the upper and lower fore cylinders 24 and 28 in Fig. 3. The hydraulic cylinders 24—31 have plungers 32—39 respectively slidably mounted therein. The plungers 32—35 in the upper cylinders extend upwardly thereabove and the plungers 36—39 in the lower cylinders extend downwardly therefrom.

As best shown in Fig. 4, an upper cam ring 40 is mounted for free vertical and canting movement against the upwardly protruding end portions of the upper plungers 32—35, preferably being connected to said end portions by ball and socket joints to permit relative universal movement. A plurality of tension springs 41 are anchored between the stator 17 and said upper cam ring and tend to maintain said cam ring in engagement with said plungers and to move said plungers inwardly. A lower cam ring 42 is mounted for free vertical and canting movement against the downwardly protruding end portions of the lower plungers 36—39 preferably being connected to said end portions by ball and socket joints. A plurality of tension springs 43 are anchored between the stator and said lower cam ring and tend to maintain said lower cam ring in engagement with said lower plungers.

The upper wings 15 and 16 have cam followers 44 and 45 respectively secured thereto. Said cam followers have rollers that ride against the upper cam ring 40 during rotation of the wings and thereby vary the pitch of the wings intracyclically through each revolution of the wings in accordance with the cant of the cam ring. Tension springs 46 are anchored between the cam followers and the mounting disc 14 to maintain said cam followers in engagement with said cam ring. Similarly, the lower wings 20 and 21 have cam followers 47 and 48 cooperable with the lower cam ring 42 and held in engagement therewith by tension springs 49.

Thus, as the wings are rotated, their pitch is varied intracyclically through each revolution in accordance with the cant of the cam rings, and the pitch of the wings may be simultaneously increased or decreased by like amounts by changing the vertical positions of the cam rings independently of the cant. The helicopter is steered and maintained on an even keel by the intracylical variations in pitch imparted during the revolutions of the wings. Rise and descent of the helicopter is effected by increasing or decreasing the pitch of the wings independently of the cant.

The mechanism within the helicopter for effecting control of the cam rings is illustrated in detail in Figs. 1 and 2. Such mechanism is mounted on a supporting plate 50, having a central aperture 51, and being supported within the helicopter by any appropriate means.

Eight hydraulic cylinders, corresponding to the eight cylinders 24—31 secured to the stator, are secured to the supporting plate 50 and, as shown in Fig. 1, are arranged as follows: athwartships cylinders 52—55, arranged in pairs at each side of the supporting plate, fore cylinders 56 and 57, and aft cylinders 58 and 59. The athwartships cylinders 52 and 53 are connected to the upper and lower athwartships cylinders 27 and 31 respectively on the opposite sides by conduits 60 and 61. The athwartships cylinders 54 and 55 are connected to the upper and lower athwartships cylinders 26 and 30 respectively on the opposite sides by conduits 62 and 63. The fore cylinders 56 and 57 are connected to the upper and lower aft cylinders 25 and 29 by conduits 64 and 65. The aft cylinders 58 and 59 are connected to the fore cylinders 24 and 28 by conduits 66 and 67. Preferably the upper portions of the conduits are formed as longitudinal bores through the walls of the sleeve 11 and through the stator 17, as illustrated in the case of the conduit 66 in Fig. 3. The conduits and cylinders contain a suitable hydraulic fluid.

As best shown in Fig. 2, a tubular control post 68 is mounted in the body of the helicopter for universal and rotary movement, as, for example, in a ball and socket joint 69, and extends through the aperture 51 in the supporting plate 50. A frame 70, preferably octagonal in plan, is slidably mounted on the supporting plate surrounding the aperture 51. Means are provided slidably and universally connecting said frame with said control post, whereby universal movement of said control post slides said frame relative to the supporting plate in the direction of movement of the control post, and rotary movement of the control post rotates the frame relative to the supporting plate.

The connecting means comprises an inner gimbal ring 71, having one or more spline portions 72 slidable in grooves 73 in the sides of the control post. The inner gimbal ring is pivotally connected to an outer gimbal ring 74 for movement about an axis 75 (Fig. 1). The outer gimbal ring in turn is pivotally connected to the frame 70 for movement about an axis 76 normal to said first axis of pivoting.

Shafts 77, 78, 79 and 80 are journaled in suitable bearings on the frame 70 and are interconnected by a plurality of bevel gears 81. By such construction translational movement of the frame moves the shafts translationally with the frame and rotation of any one of the shafts is transmitted to the others.

A rod 82 is supported within the bore of the control post 68 for axial movement therein. A suitable control handle 83 is pivotally connected to the upper end of the control post and connected by a suitable linkage 84 to said rod, as best shown in Fig. 2. Raising the handle thus raises the rod and depressing the handle depresses the rod.

A master hydraulic cylinder 85 is fixed to the control post, preferably adjacent the lower end thereof, and contains a plunger 86 slidable therein. The plunger 86 is connected to the rod 82 by a connecting member 87 in such manner that axial movement of said rod relative to said control post is transmitted to said plunger.

A slave hydraulic cylinder 88 is fixed to the frame 70 and contains a plunger 89 slidable therein. Said plunger has a rack gear 90 formed on its underside, the teeth of which mesh with the teeth of a pinion 91 fixed to the shaft 78. The master cylinder 85 is connected to the slave cylinder 88 by a conduit 92, at least a portion of which is flexible, and the system contains a suitable hydraulic fluid.

By such construction, raising the rod 68 forces the plunger 89 to the right as viewed in Fig. 2, and depressing the rod draws the plunger to the left. Movement of the plunger rotates the shafts 77—80, but, as long as the rod and plunger are held fixed, the shafts are held against rotation.

As shown in Fig. 1, thrust members 93, 94, 95 and 96 are mounted on the frame 70 for sliding movement inwardly and outwardly relative to the frame. Said thrust members are preferably substantially identical in construction, each comprising a bearing portion 97 and a pair of rack gears 98 fixed thereto and extending in a direction perpendicular to the plane of said bearing portion. The rack gears 98 extend through apertures in the adjacent sides of the frame 70 and are engaged by suitable pinions 99 fixed to the shafts 77—80.

With the rod 82 held fixed relative to the control post, translational or rotary movement of the frame 70 relative to the supporting plate 50 moves the thrust members correspondingly, since rotational movement of the shafts 77—80 is prevented, as hereinbefore explained. When the rod is moved axially relative to the control post, the shafts 77—80 are rotated and the thrust members moved inwardly or outwardly by like distances relative to the frame 70. It is seen that raising the rod moves the thrust members outwardly and that depressing the rod moves them inwardly.

The hydraulic cylinders 52—59 contain plungers 100—107 respectively, slidably mounted therein. The plungers are provided with heads 108 adapted to abut against the bearing portions 97 of the thrust members 93—96, but not otherwise secured to said thrust members.

As hereinbefore described, the cylinders 52—59 are hydraulically connected to the cylinders 24—31 on the stator 17. The springs 40 and 43, connected between the cam rings 40 and 42 and said stator, urge the plungers 32—39 in the cylinders 24—31 inwardly and thereby urge the plungers 100—107 in the cylinders 52—59 outwardly relative to the cylinders.

Movement of the thrust members 93—96 outwardly, or any outward component of their movement, forces some or all of the plungers 100—107 outwardly relative to the supporting plate or inwardly relative to the cylinders 52—59. Such movement is transmitted to the plungers 32—39 and moves them outwardly relative to the cylinders 26—31. Movement of the thrust members 93—96 inwardly, or any component of their movement inwardly, relaxes the force against the plungers 100—107, but the force of the springs 41 and 43 keeps the plunger heads in abutting engagement with the bearing portions 97 of said thrust members. Such movement thereby moves the plunger 32—39 inwardly. The plunger heads are freely slidable against the thrust members, thus permitting free transverse movement of the thrust members with respect to the plungers.

It is seen that with the construction described any combination of movements of the frame or plungers may take place. Thus the rod 82 may be raised or lowered to move the thrust members outwardly or inwardly relative to the frame, while the control post is being moved universally or rotated or both in any direction to simultaneously impart translational movement to the frame relative to the supporting plate.

The operation of a control mechanism constructed as described is as follows:

A helicopter is steered or caused to rise or descend by the pitch of its wings, which in turn is governed by the position of adjustment of the cam rings, such mode of operation being known in the prior art.

When it is desired to rise, the pitch of all wings is increased by raising the handle 83 relative to the control post. Such movement forces the thrust members 93—96 outwardly relative to the frame, and thereby forces the plungers 32—39 outwardly, which in turn raises the upper cam ring 40 and lowers the lower cam ring 42. This action take places independently of the cant of the rings and the pitch of all wings is increased by like amounts. When it is desired to descend, the reverse of the operation just described takes place.

When the control post is moved universally or tilted in any direction, the frame 70 is moved relative to the supporting plate 50 in a similar direction, and the cam rings are canted by the hydraulic mechanism to steer the helicopter. For example, if the control post is tilted 45° to the right of forward, the plungers 102, 103, 104, and 105 are forced into their cylinders and the plungers 100, 101, 106, and 107 are drawn outwardly. The plungers 33, 34, 37, and 38 are thereby forced outwardly and the plungers 32, 35, 36, and 39 move inwardly, which cants the cam rings so that their planes slope toward each other at 45° to right of forward. Such cant produces intracyclical variations in wing pitch to steer the helicopter in the direction in which the control post is tilted. The use of intracyclical variations in pitch in steering helicopters is known and hence is not explained in detail.

To rotate the helicopter about a vertical axis the control post is turned about its longitudinal axis in the direction desired, as, for example, to the left. As the square formed by the thrust members is thereby rotated to the left, or counterclockwise as viewed from above, the piston rods 101, 105, 103, and 107 are forced into their cylinders and the piston rods 100, 104, 102, and 106 drawn outwardly therefrom. Such action moves each of the cam rings 40 and 42 downwardly and the pitch of the upper wings 15 and 16 is decreased and that of the lower wings 20 and 21 increased. Such change in pitch rotates the helicopter to the left in a known manner.

While I have shown but a single embodiment of the present invention, it is obvious that the structure is subject to modification without departing from the spirit of the invention. Therefore, I do not wish to be limited by the disclosure set forth, but only by the scope of the appended claims.

The invention described herein may be manufactured and used by or for the Government of the United States of America for governmental purposes without the payment of any royalties thereon or therefor.

What is claimed is:

1. In an aircraft having rotatable wings of variable pitch and adjustably mounted cam rings for regulating the pitch of said wings, a control mechanism comprising a plate mounted within the body of the aircraft and having a central aperture, hydraulic cylinders fixed to said plate in fore and aft and athwartships positions and having plungers slidably mounted therein, hydraulic cylinders mounted adjacent said cam rings in fore and aft and athwartships positions and having plungers slidably mounted therein engageable with said cam rings, spring means urging said cam rings into engagement with said second named plungers, conduit means connecting said first named cylinders in fore and aft positions with said second named cylinders in aft and fore positions respectively, conduit means connecting said first named cylinders in athwartships positions with said second named cylinders in athwartships positions on opposite sides, a tubular control post mounted in said body for universal and rotary movement and extending through the aperture in said plate, a rod mounted for axial movement in said control post, a frame slidably supported on said plate, means universally pivoting said control post to said frame for sliding said frame relative to said plate on angular movement of said control post and rotating said frame relative to said plate on rotation of said control post, means on said frame engageable with said first named plungers for moving said first named plungers in response to movement of said frame relative to said plate, thereby adjusting the cant of said cam rings, and hydraulic means operatively connecting said rod with said plunger moving means for moving said first named plungers substantially equidistantly on axial movement of said rod, thereby adjusting the position of said cam rings independently of the cant.

2. In an aircraft having rotatable wings of variable pitch and adjustably mounted cam rings for regulating the pitch of said wings, a control mechanism comprising a plate mounted within the body of the aircraft and having a central aperture, hydraulic cylinders fixed to said plate in fore and aft and athwartships positions and having plungers slidably mounted therein, hydraulic cylinders mounted adjacent said cam rings in fore and aft and athwartships positions and having plungers slidably mounted therein engageable with said cam rings, spring means urging said cam rings into engagement with said second named plungers, conduit means connecting said first named cylinders with said second named cylinders, a tubular control post mounted in said body for universal and rotary movement and extending through the aperture in said plate, a rod mounted for axial movement in said control post, a frame slidably supported on said plate, means universally pivoting said control post to said frame for sliding said frame relative to said plate on angular movement of said control post and rotating said frame relative to said plate on rotation of said control post, means on said frame engageable with said first named plungers for moving said first named plungers in response to movement of said frame relative to said plate, thereby adjusting the cant of said cam rings, and hydraulic means operatively connecting said rod with said plunger moving means for moving said first named plungers substantially equidistantly on axial movement of said rod, thereby adjusting the position of said cam rings independently of the cant.

3. In an aircraft having rotatable wings of variable pitch and adjustably mounted cam rings for regulating the pitch of said wings, a control mechanism comprising a plate mounted within the body of the aircraft, hydraulic cylinders fixed to said plate and having plungers slidably mounted therein, hydraulic cylinders mounted adjacent said cam rings and having plungers slidably mounted therein engageable with said cam rings, spring means urging said cam rings into engagment with said second named plungers, conduit means connecting said first named cylinders with said second named cylinders, a tubular control post mounted in said body for universal and rotary movement, a rod mounted for axial movement in said control post, a frame slidably supported on said plate, means universally pivoting said control post to said frame for sliding said frame relative to said plate on movement of said control post, and means for moving said first named plungers in response to movement of said frame relative to said plate, thereby adjusting the cant of said cam rings, and for moving said first named plungers substantially equidistantly on axial movement of said rod, thereby adjusting the position of said cam rings independently of the cant.

4. In an aircraft having rotatable wings of variable pitch and adjustably mounted cam rings for regulating the pitch of said wings, a control mechanism comprising supporting means mounted within the body of the aircraft, hydraulic cylinders on said supporting means having plungers slidably mounted therein, hydraulic cylinders mounted adjacent said cam rings and having plungers slidably mounted therein engageable with said cam rings, conduit means connecting said first named cylinders with said second named cylinders, a control post movably mounted in said body, a rod supported for axial movement on said control post, a frame slidably supported on said supporting means, means universally pivoting said control post to said frame for moving said frame relative to said supporting means on movement of said control post, and means for moving said first named plungers in response to movement of said frame relative to said supporting means, thereby adjusting the cant of said cam rings, and for moving said first named plungers substantially equidistantly on axial movement of said rod, thereby adjusting the position of said cam rings independently of the cant.

5. In an aircraft having rotatable wings of variable pitch and adjustably mounted cam rings for regulating the pitch of said wings, a control mechanism comprising supporting means mounted within the body of the aircraft, a control post movably mounted in said body, a rod supported for axial movement on said control post, a frame slidably supported on said supporting means, means universally pivoting said control post to said frame for moving said frame relative to said supporting means on movement of said control post, and hydraulic means engageable with said frame and said cam rings for adjusting the cant of said cam rings on movement of said frame relative to said supporting means and for adjusting the position of said cam rings independently of the cant on axial movement of said rod.

6. In an aircraft having rotatable wings of variable pitch and adjustably mounted cam rings for regulating the pitch of said wings, a control mechanism comprising a plate mounted within the body of the aircraft and having a central aperture, hydraulic cylinders fixed to said plate in fore and aft and athwartships positions and having plungers slidably mounted therein, hydraulic cylinders mounted adjacent said cam rings in fore and aft and athwartships positions and having plungers slidably mounted therein engageable with said cam rings, spring means urging said cam rings into engagement with said second named plungers, conduit means connecting said first named cylinders with said second named cylinders, a control post mounted in said body for universal and rotary movement and extending through the aperture in said plate, a frame slidably supported on said plate, means universally pivoting said control post to said frame for sliding said frame relative to said plate on angular movement of said control post and rotating said frame relative to said plate on rotation of said control post, means on said frame engageable with said first named plungers for moving said first named plungers in response to movement of said frame relative to said plate, thereby adjusting the cant of said cam rings, and means for moving said first named plungers equidistantly, thereby adjusting the position of said cam rings independently of the cant.

7. In an aircraft having rotatable wings of variable pitch and adjustably mounted cam rings for regulating the pitch of said wings, a control mechanism comprising supporting means mounted within the body of the aircraft, hydraulic cylinders on said supporting means having plungers slidably mounted therein, hydraulic cylinders mounted adjacent said cam rings and having plungers slidably mounted therein engageable with said cam rings, conduit means connecting said first named cylinders with said second named cylinders, a control post movably mounted in said body, a frame slidably supported on said supporting means, means universally pivoting said control post to said frame for moving said frame relative to said supporting means on movement of said control post, means for moving said first named plungers in response to movement of said frame relative to said supporting means, thereby adjusting the cant of said cam rings, and means for moving said first named plungers equidistantly, thereby adjusting the position of said cam rings independently of the cant.

8. In an aircraft having rotatable wings of variable pitch and adjustably mounted cam rings for regulating the pitch of said wings, a control mechanism for regulating the pitch of said wings comprising supporting means mounted within the body of the aircraft, hydraulic cylinders on said supporting means having plungers slidably mounted therein, hydraulic cylinders mounted adjacent said cam rings and having plungers slidably mounted therein engageable with said cam rings, conduit means connecting said first named cylinders with said second named cylinders a control post movably mounted in said body, a frame slidably supported on said supporting means engageable with said first named plungers for moving said first named plungers in response to movement of said frame, and means universally pivoting said control post to said frame for moving said frame relative to said supporting means on movement of said control post, thereby regulating the pitch of said wings for steering the aircraft.

9. In an aircraft having rotatable wings of variable pitch and adjustably mounted cam rings for regulating the pitch of said wings, a control mechanism for regulating the pitch of said wings comprising supporting means within the body of the aircraft, hydraulic cylinders on said supporting means having plungers slidably mounted therein, hydraulic cylinders mounted adjacent said cam rings and having plungers slidably mounted therein engageable with said cam rings, conduit means connecting said first named cylinders with said second named cylinders, thrust means mounted on said supporting means constructed and arranged to move said first named plungers equidistantly, a control post movably mounted within the body of the aircraft, movable means mounted for axial movement in said control post, and hydraulic means engageable with said thrust means and actuable on axial movement of said axially movable means thereby regulating the pitch of said wings for causing the aircraft to rise or descend.

10. The apparatus of claim 8 wherein the control post is mounted for axial rotation, thereby to turn the helicopter about a vertical axis.

JOHN F. FAULKNER.

REFERENCES CITED

The following references are of record in the file of this patent:

UNITED STATES PATENTS

| Number | Name | Date |
|---|---|---|
| 986,882 | Werndl | Mar. 14, 1911 |
| 1,870,928 | Smith | Aug. 9, 1932 |
| 2,021,470 | Upson | Nov. 19, 1935 |
| 2,082,410 | McCauley | June 1, 1937 |
| 2,133,043 | Roethenhoefer | Oct. 11, 1938 |
| 2,394,846 | Cox | Feb. 12, 1946 |

FOREIGN PATENTS

| Number | Country | Date |
|---|---|---|
| 287,960 | Great Britain | Mar. 26, 1928 |
| 420,928 | Great Britain | Dec. 11, 1934 |